United States Patent
Carman et al.

(10) Patent No.: US 8,022,015 B2
(45) Date of Patent: Sep. 20, 2011

(54) METHOD OF FRACTURING WITH PHENOTHIAZINE STABILIZER

(75) Inventors: Paul S. Carman, Spring, TX (US); Jeffrey C. Dawson, Conroe, TX (US)

(73) Assignee: Baker Hughes Incorporated, Houston, TX (US)

( * ) Notice: Subject to any disclaimer, the term of this patent is extended or adjusted under 35 U.S.C. 154(b) by 233 days.

(21) Appl. No.: 12/020,671

(22) Filed: Jan. 28, 2008

(65) Prior Publication Data

US 2009/0192058 A1    Jul. 30, 2009

(51) Int. Cl.
 C09K 8/528 (2006.01)
 E21B 43/26 (2006.01)
(52) U.S. Cl. .................................. 507/224; 166/308.5
(58) Field of Classification Search ............... 507/224; 166/308.5
See application file for complete search history.

(56) References Cited

U.S. PATENT DOCUMENTS

| | | | |
|---|---|---|---|
| 3,146,200 A | | 8/1964 | Goldstein |
| 3,225,000 A | | 12/1965 | Welch |
| 4,624,795 A | | 11/1986 | Dawson et al. |
| 5,520,848 A | * | 5/1996 | Evans ........................ 252/405 |
| 5,960,877 A | * | 10/1999 | Funkhouser et al. ........ 166/270 |
| 6,017,855 A | | 1/2000 | Dawson et al. |
| 6,383,990 B1 | | 5/2002 | Dawson et al. |
| 6,395,853 B1 | | 5/2002 | Oswald et al. |
| 6,649,572 B2 | | 11/2003 | Dawson et al. |
| 6,820,694 B2 | | 11/2004 | Willberg et al. |
| 7,012,044 B2 | | 3/2006 | Dawson et al. |
| 7,205,264 B2 | | 4/2007 | Boles |
| 2003/0196809 A1 | | 10/2003 | Willberg et al. |
| 2004/0244975 A1 | | 12/2004 | Heier et al. |
| 2004/0266629 A1 | | 12/2004 | Maroy et al. |

FOREIGN PATENT DOCUMENTS

| DE | 102005056436 | 5/2007 |
|---|---|---|
| EP | 0658612 | 6/1995 |

OTHER PUBLICATIONS

PCT Partial International Search Report dated May 20, 2009, for PCT Application No. PCT/US2009/032142, filed Jan. 27, 2009.
PCT International Search Report and Written Opinion dated Jul. 6, 2009, for PCT Application No. PCT/US2009/032142, filed Jan. 27, 2009.

* cited by examiner

*Primary Examiner* — Timothy J. Kugel
*Assistant Examiner* — Aiqun Li
(74) *Attorney, Agent, or Firm* — John Wilson Jones; Jones & Smith, LLP

(57) ABSTRACT

Compositions and methods of treating high temperature subterranean formations of up to about 500° F. (260° C.) are provided. The compositions and methods utilize a high molecular weight synthetic copolymer and a pH buffer than maintains a pH in a range of about 4.5 to about 5.25 for the compositions. The high molecular weight synthetic copolymer is derived from acrylamide, acrylamidomethylpropanesulfonic acid, and vinyl phosphonate.

20 Claims, 3 Drawing Sheets

METHOD OF FRACTURING WITH PHENOTHIAZINE STABILIZER

BACKGROUND OF THE INVENTION

1. Field of the Invention

The invention relates to methods and compositions for treating high temperature subterranean formations. More particularly, it relates to methods and compositions for treating a subterranean formation penetrated by a wellbore into which a high temperature well treatment fluid is injected at temperatures of up to about 500° F. (260° C.).

2. Description of the Related Art

The continued exploration for hydrocarbon-containing subterranean formations is frequently requiring operators to drill significantly deeper than prior drilling operations. Besides drilling deeper, operators are always trying to enhance hydrocarbon production. One way of enhancing hydrocarbon production from many formations is by hydraulic fracturing. In the hydraulic fracturing process, a viscous fracturing fluid is injected into the wellbore at such a rate and pressure so that a crack or fracture is opened into the surrounding formation. Typically, hydraulic fracturing fluids contain guar gum or guar gum derivatives or viscoelastic surfactants as thickeners to assist in proppant transport, friction reduction, fluid loss control, and controlling fracture geometry. The hydraulic fracturing fluids generally transport proppant into the fracture to prevent the fracture from fully closing. Besides being able to place the proppant in the fracture, the fluid must be able to degrade by lowering its viscosity so that a low viscosity fluid results that can be easily cleaned out of the fracture just prior to hydrocarbon production. As the drilling depths continue to increase, the formation temperatures also increase. Unfortunately, as temperatures exceed 325° F. (162.8° C.), many guar-based fracturing fluids are ineffective because they lose their viscosity in part or in whole and therefore become less effective or completely ineffective. Many guar-based fracturing fluids degrade at rates preventing optimum proppant placement, fluid loss control, or fracture geometry.

At high temperatures, guar-based polymers readily undergo auto-degradation by a number of methods, usually within periods of time shorter than what is necessary to complete the fracturing treatment. The degradation generally gets worse as the temperatures continue to increase. Increasing temperatures exasperates this behavior. Most degradation results in the cleavage of the polymer chains, which simultaneously reduces the fluid's viscosity. This can be due to oxidation from residual amounts of air entrained in the fluid, thermal induced cleavage of the acetal linkage along the polymer backbone, hydrolysis of the polymer, or a combination thereof.

A need exists for fracturing fluids that can be used in the deeper and hotter formations that are in operation while simultaneously being able to degrade in a controlled manner when the fracturing process is complete. It is desirable for such fracturing fluids to be stable to enable the fracturing fluids to travel further distances within the fractures.

SUMMARY OF THE INVENTION

In view of the foregoing, a high temperature well treatment fluid that is capable of fracturing a subterranean formation in temperatures of up to about 500° F. (260° C.) is provided as an embodiment of the present invention. The high temperature well treatment fluid includes water, a high molecular weight synthetic copolymer, a crosslinking agent, and a pH buffer. In an aspect, the high molecular weight synthetic copolymer is derived from acrylamide, acrylamidomethylpropanesulfonic acid, and vinyl phosphonate. In an aspect, the copolymer comprises about 30-about 80 wt. % acrylamide, about 20-about 50 wt. % acrylamidomethylpropanesulfonic acid, and about 1-about 5 wt. % vinyl phosphonate. The pH buffer enables the high temperature well treatment fluid to maintain a pH in a range of about 4.5 to about 5.25.

Besides high temperature well treatment fluid compositions, methods of fracturing subterranean formations are also provided as embodiments of the present invention. In an embodiment, a method of fracturing a subterranean formation having a temperature of up to about 500° F. (260° C.) is provided. In this embodiment, a high temperature well treatment fluid comprising water; a high molecular weight copolymer derived from acrylamide, acrylamidomethylpropanesulfonic acid, and vinyl phosphonate; a crosslinking agent; and a pH buffer is contacted with at least a portion of the subterranean formation at pressures sufficient to fracture the subterranean formation. The pH buffer maintains a pH of the high temperature well treatment fluid in a range of about 4.5 to about 5.25.

Another method of fracturing a subterranean formation is provided as another embodiment of the present invention. In this embodiment, water is contacted with a high molecular weight copolymer derived from acrylamide, acrylamidomethylpropanesulfonic acid, and vinyl phosphonate to form a water-soluble polymer. The water-soluble polymer is then contacted with a crosslinking agent and a pH buffer to produce a gelling fluid. At least a portion of the subterranean formation is contacted with the gelling fluid at pressures sufficient to fracture the formation. As in other embodiments of the present invention, the pH buffer maintains a pH of the gelling fluid in a range of about 4.5 to about of about 5.25.

Other additives that are useful in high temperature well treatment fluids can also be used in embodiments of the present invention. Such additives can include additional monomers that can be copolymerized with the high molecular weight polymers of the high temperature well treatment fluids, stabilizers to help the high temperature well treatment fluids perform for extended periods of time, crosslinking agents to help increase the viscosity of the high temperature well treatment fluids, breakers to help break down the high temperature well treatment fluids, surfactants that help with hydration of the high temperature well treatment fluids, and the like. Other suitable compounds that are useful in high temperature well treatment fluids, such as proppant and other additives, will be apparent to those of skill in the art and are to be considered within the scope of the present invention.

Figure 1:
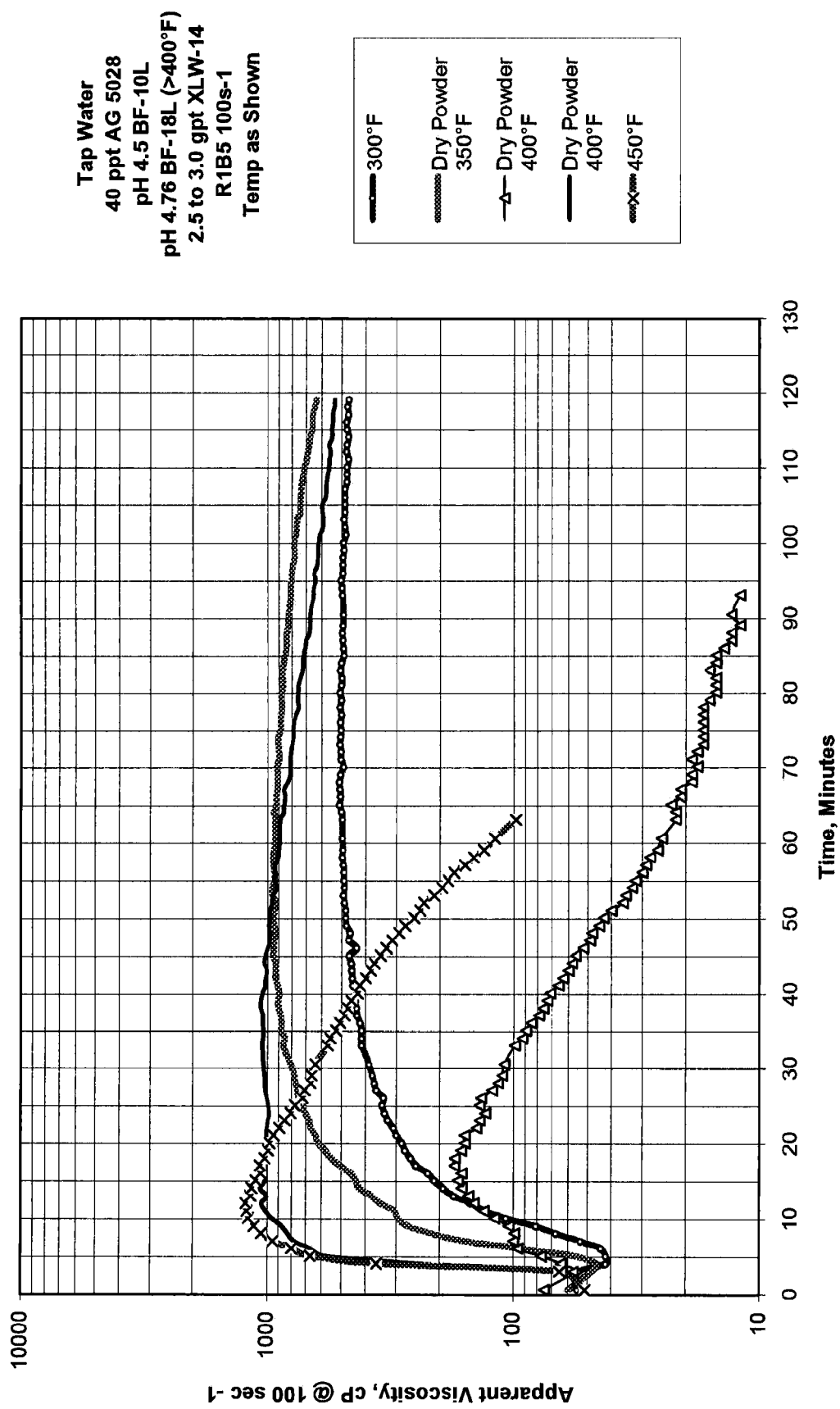
FIG. 1 is a graph of the apparent viscosity of the high temperature well treatment fluid with and without a breaker versus time at various temperatures in accordance with embodiments of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the hydrocarbon recovery operation and in the treatment of well bores. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

A high temperature well treatment fluid that is capable of fracturing a subterranean formation in temperatures of up to about 500° F. (260° C.) is provided as an embodiment of the present invention. In this embodiment, the high temperature well treatment fluid comprises water, a high molecular weight synthetic copolymer, a crosslinking agent, and a pH buffer. The high molecular weight synthetic copolymer is derived from acrylamide, acrylamidomethylpropanesulfonic acid, and vinyl phosphonate. In an aspect, the acrylamide can be derived from at least one amide of an ethylenically unsaturated carboxylic acid. In an aspect, the high molecular weight synthetic copolymer has a K-value of greater than about 375. In an aspect, the K-value ranges between about 50 to about 750; or alternatively, between about 150 to about 350. The K-value (i.e. Fikentscher's K-value) is a measure of a polymer's average molecular weight. The test method generally used by those skilled in the art to calculate the K-value is determined by ISO 1628-2 (DIN 53726). In embodiments of the present invention, the high temperature well treatment fluid comprises about 25 wt. % of the high molecular weight copolymer in an emulsion. The high molecular weight copolymer in emulsion can be present in a range of about 10 gallons per 1,000 gallons high temperature well treatment fluid at temperatures of less than 350° F. (176.7° C.) to about 25 gallons per 1,000 gallons high temperature well treatment fluid at 500° F. (260° C.). The concentration of the high molecular weight synthetic copolymer depends upon the temperature of the subterranean formation and the duration in which the high molecular weight synthetic copolymer will be exposed to the elevated temperatures. In general, more high molecular weight synthetic copolymer is required at higher temperatures than at the lower temperatures.

In an aspect, the copolymer is derived from about 20-about 90 wt. % acrylamide, about 9-about 80 wt. % acrylamidomethylpropanesulfonic acid, and about 0.1-about 20 wt. % vinyl phosphonate; alternatively, about 30-about 80 wt. % acrylamide, about 25-about 60 wt. % acrylamidomethylpropanesulfonic acid, and about 0.2-about 10 wt. % vinyl phosphonate; alternatively, about 40-about 70 wt. % acrylamide, about 30-about 40 wt. % acrylamidomethylpropanesulfonic acid, and about 1-about 3 wt. % vinyl phosphonate; or alternatively, about 50 wt. % acrylamide, about 30 wt. % acrylamidomethylpropanesulfonic acid, about 2 wt. % vinyl phosphonate, and a remainder of copolymers of acrylamide and acrylamidomethylpropanesulfonic acid.

The pH buffer of the present invention helps maintain a low pH of the high temperature well treatment fluid in a range of about 4.5 to about 5.25. In an aspect, the pH buffer comprises acetic acid and sodium acetate. In another aspect, the pH buffer comprises acetic acid, sodium acetate, formic acid, or combinations thereof. The amount of pH buffer that is needed is the amount that will effectively maintain a pH of the high temperature well treatment fluid in a range of about 4.5 to about 5.25; or alternatively, in a range of about 4.75 to about 5; or alternatively, about 5. In an aspect, the pH buffer is a true pH buffer, as opposed to a pH adjuster, as will be understood by those of skill in the art. The low pH of the systems and methods described herein aid in clean up of the fluid after well treatment processes.

At temperatures above 400° F. (204.4° C.), a pH buffer comprising acetic acid and sodium acetate having a pH of about 5 at 25% can be used. At temperatures below 400° F. (204.4° C.), other pH buffers can be used, such as acetic acid and formic acid buffers. Generally, any pH buffer capable of maintaining a pH of the high temperature well treatment fluid within in a range of about 4.5 to about 5.25 and without interfering with the remaining components of the high temperature well treatment fluids can be used. Other suitable pH buffers will be apparent to those of skill in the art and are to be considered within the scope of the present invention.

The pH buffer comprising acetic acid and sodium acetate having a pH of about 5 can be used in a concentration ranging from about 1 gallon per 1,000 gallons high temperature well treatment fluid to about 3 gallons per 1,000 gallons high temperature well treatment fluid, depending upon the temperature of the subterranean formation.

The high molecular weight synthetic copolymer can be further copolymerized with other monomers to provide various advantages related to the stability of the high temperature well treatment fluid. Similar to guar-based high temperature well treatment fluids, the viscosity of the high temperature well treatment fluid of the present invention can be significantly enhanced when first copolymerized with small amounts of monomers and crosslinked, at the wellsite, with transition metals, such as iron, titanium, zirconium, chromium, hafnium, aluminum, and combinations thereof. Suitable monomers that can be copolymerized with the high molecular weight synthetic polymer include monomers selected from the group consisting of an alkali metal of acrylamidomethylpropanesulfonic acid, an ammonium salt of acrylamidomethylpropanesulfonic acid, styrene sulfonate, vinyl sulfonate, N-vinylpyrolidone, N-vinylformamide, N-vinylacetamide, N,N-diallylacetamide, methacrylamide, acrylamide, N,N-dimethylacrylamide, methacrylamide, a divalent cation from calcium salt, a divalent cation from magnesium salt, and combinations thereof. For example, alkali metal or ammonium salts of acrylamidomethylpropanesulfonic acid (AMPS), styrene sulfonate or vinyl sulfonate can be copolymerized to add salt tolerance to the high molecular weight synthetic polymer. Divalent cations from calcium salt and magnesium salt are also useful for adding salt tolerance to the high molecular weight synthetic polymer. As another example, monomers such as N-vinylamides, N-vinylpyrolidone, N-vinylformamide, N-vinylacetamide, and N-diallylacetamide can also be copolymerized with the high molecular weight synthetic polymer to assist in proppant transport by adsorbing onto the proppant surface. The copolymers of the high molecular weight synthetic copolymer can be made by any polymerization method necessary to produce high molecular weight copolymers. A particularly effective method of producing the copolymers is by invert polymer emulsion because it can be easily metered into a flowing stream of water during fracturing processes and it can be made to rapidly hydrate, which may reduce the amount of equipment needed at the wellsite.

The high temperature well treatment fluid of the present invention can also include a stabilizer to help the high temperature well treatment fluids perform for extended periods of time. One manner in which stabilizers assist in extending run times of high temperature well treatment fluids is by maintaining the viscosity of the high temperature well treatment fluid for longer periods of time than the high temperature well treatment fluid would be capable of doing without the stabilizer. In an aspect, the stabilizer is sodium thiosulfate, phenothiazine, or combinations thereof. The use of phenothiazine as a stabilizer is described in U.S. patent application Ser. No. 12/020,755 that was filed the same day as the present specification and is incorporated by reference in its entirety. Another suitable stabilizer is a gel stabilizer that is commercially available as GS-1L that contains sodium thiosulfate from BJ Services Company.

In general, any stabilizer compound capable of maintaining viscosity of the high temperature well treatment fluid long enough to perform the fracturing process can be used. The amount of stabilizer that can be used includes an effective amount that is capable of maintaining viscosity, i.e. preventing thermal degradation, of the high temperature well treatment fluid long enough to perform the fracturing process.

In an aspect, the high temperature well treatment fluid of the present invention can also include a crosslinking agent. A suitable crosslinking agent can be any compound that increases the viscosity of the high temperature well treatment fluid by chemical crosslinking, physical crosslinking, or any other mechanisms. For example, the gellation of the high molecular weight synthetic copolymer can be achieved by crosslinking the high molecular weight synthetic copolymer with metal ions including boron, zirconium, and titanium containing compounds, or mixtures thereof. One class of suitable crosslinking agents is zirconium-based crosslinking agents. Suitable crosslinking agents can include zirconium oxychloride, zirconium acetate, zirconium lactate, zirconium malate, zirconium glycolate, zirconium lactate triethanolamine, zirconium citrate, titanium lactate, titanium malate, titanium citrate, titanium, aluminum, iron, antimony, a zirconate-based compound, zirconium triethanolamine, an organozirconate, or combinations thereof. XLW-14 is a particularly suitable zirconate-based crosslinking agent that is commercially available from BJ Services Company and described in U.S. Pat. No. 4,534,870, which is incorporated by reference in its entirety.

The amount of the crosslinking agent needed in the high temperature well treatment fluid depends upon the well conditions and the type of treatment to be effected, but is generally in the range of from about 10 ppm to about 1000 ppm of metal ion of the crosslinking agent in the high molecular weight synthetic polymer fluid. In an aspect, the amount of crosslinking agent that can be used includes an effective amount that is capable of increasing the viscosity of the high temperature well treatment fluid to enable it to perform adequately in fracturing processes. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

When zirconium is used as a crosslinking agent, zirconium has a built-in delay and is used from 1 gallon per 1,000 gallons to 2 gallons per 1,000 gallons depending on the temperature and high molecular weight synthetic polymer concentration in the high temperature well treatment fluid. If extra stability time is required, an additional stabilizer, such as sodium thiosulfate (e.g., GS-1L from BJ Services), can be used in a range of about 1 gallon per 1,000 gallons high temperature well treatment fluid to about 3 gallons per 1,000 gallons high temperature well treatment fluid.

The high temperature well treatment fluid of the present invention can also include a surfactant to aid in well treatment processes. Surfactants typically aid in the hydration of the high molecular weight synthetic polymer. Without the surfactant, the high temperature well treatment fluids of the present invention can take up to about 20 to 30 minutes to adequately hydrate. With the addition of the surfactant, the hydration time is substantially reduced. With the surfactant, the hydration can take less than 5 minutes. 90-95% of the high temperature well treatment fluid of the present invention can be hydrated in about 1 to 2 minutes with a suitable surfactant. The type and concentration of the surfactant can control the hydration time of the high temperature well treatment fluid. Any suitable surfactant can be used, as will be apparent to those of skill in the art. In an aspect, a nonionic surfactant such as an ethoxylated alcohol can be used. A suitable surfactant that can be used in the present invention is a proprietary blend of two different surfactants commercially available from Rhodia. The Rhodia blend contains 50 wt. % Rhodasurf BC 720, which is an alkoxypoly(ethyleneoxy) ethanol surfactant, and an ethoxylated long chain alcohol having between 10 and 18 carbon molecules. In an aspect, the surfactant comprises alkoxypoly(ethyleneoxy)ethanol, an ethoxylated alcohol having from 10 to 18 carbon molecules, and combinations thereof Effective types and amounts of suitable surfactants will be apparent to those of skill in the art and are to be considered within the scope of the present invention.

In an aspect of the present invention, the high temperature well treatment fluid also includes a breaker that is capable of degrading the high temperature well treatment fluid in a controlled manner to assist operators in clean up and removal of the high temperature well treatment fluid when the well treatment process is complete. For example, the breakers can assist in clean-up efforts after fracturing treatments. Viscometer tests have shown that most breakers that contain oxidizing agents are useful in the degradation of the fluid. Suitable oxidizing agents can include sodium bromate, ammonium persulfate, sodium persulfate, sodium perborate, sodium percarbonate, calcium peroxide, magnesium peroxide and sodium periodate. Controlled degradation can be recognized because it results in a simultaneous and controlled reduction in fluid viscosity. Testing suggests that the stability of the high temperature well treatment fluid of the present invention, even with the intentional addition of the breakers that contain oxidizing agents, greatly exceeds that obtained by guar-based well treatment fluids, allowing optimized treatments to be employed at well temperatures ranging from 250° F. (121.1° C.) to 500° F. (260° C.).

In an aspect, the breaker comprises sodium bromate, either as is or encapsulated. Sodium bromate has been shown to easily degrade the high temperature well treatment fluid in a controlled manner. In an aspect, the breaker comprises sodium bromate, ammonium persulate, sodium persulfate, sodium perborate, sodium percarbonate, calcium peroxide, magnesium peroxide, sodium periodate, an alkaline earth metal percarbonate, an alkaline earth metal perborate, an alkaline earth metal peroxide, an alkaline earth metal perphosphate, a zinc peroxide, a zinc perphosphate, a zinc perborate, a zinc percarbonate, a boron compound, a perborate, a peroxide, a perphosphate, or combinations thereof the breaker comprising sodium bromate, ammonium persulate, sodium persulfate, sodium perborate, sodium percarbonate, calcium peroxide, magnesium peroxide, sodium periodate, or combinations thereof Other types and amounts of suitable breakers that can be used in the present invention will be apparent to those of skill in the art are to be considered within the scope of the present invention.

When sodium bromate is used to break the high temperature well treatment fluid of the present invention, the concentration of the sodium bromate can be from about 0.5 ppt high temperature well treatment fluid to 20 ppt high temperature well treatment fluid. The concentration will depend on if the sodium bromate is run as a solid, a solution, or encapsulated, such as High Perm BR™ Gel Breaker from BJ Services Company.

The pH buffers, stabilizers, crosslinking agents, breakers, monomers, and other additives described herein can be used in the method embodiments as well as the compositional embodiments of the present invention. Other suitable compounds for high temperature well treatment fluids, such as proppant and other additives, will be apparent to those of skill in the art and are to be considered within the scope of the present invention.

Besides the compositions of the high temperature well treatment fluid, methods of fracturing a subterranean formation having a temperature of up to about 500° F. (260° C.) are provided as embodiments of the present invention. In one embodiment, a high temperature well treatment fluid is contacted with at least a portion of the subterranean formation at pressures sufficient to fracture the subterranean formation. In an aspect, the high temperature well treatment fluid includes water; a high molecular weight polymer comprising acrylamide, acrylamidomethylpropanesulfonic acid, and vinyl phosphonate; a crosslinking agent; and a pH buffer that maintains a pH of the high temperature well treatment fluid in a range of about 4.5 to about 5.25.

Another method of fracturing a subterranean formation is provided as another embodiment of the present invention. In this embodiment, water is contacted with a high molecular weight copolymer derived from acrylamide, acrylamidomethylpropanesulfonic acid, and vinyl phosphonate to form a water-soluble polymer that is then contacted with a crosslinking agent and a pH buffer to produce a gelling fluid. The gelling fluid is then contacted with at least a portion of the subterranean formation at pressures sufficient to fracture the formation. As with other embodiments of the present invention, the pH buffer maintains a pH of the gelling fluid in a range of about 4.5 to about of about 5.25.

The compositions and methods described herein perform well when compared with traditional guar-based well treatment fluids. Well treatment fluids require sufficient viscosity that lasts long enough for the well treatment fluid to complete the well treatment process, such as fracturing. The compositions and methods describe herein are stabilized for much longer than most prior art well treatment fluids at elevated temperatures. For example, the high temperature well treatment fluid of the present invention can be pumped at a temperature of up to about 500° F. (260° C.) for a period of up to about 2 hours. The high temperature well treatment fluid can be pumped at a temperature of up to about 425° F. (218.3° C.) for a period of up to about 4 hours. The high temperature well treatment fluid can be pumped at a temperature of up to about 400° F. (204.4° C.) for a period of up to about 6 hours.

The methods and compositions of the present invention do not require any new or additional equipment. Traditional well treatment fluid equipment can be used without any modification. The methods and compositions of the present invention can be used in subterranean formations having higher temperatures than many prior art well treatment fluids are capable of functioning properly.

EXAMPLES

Example 1

Samples of the high temperature well treatment fluid of the present invention were prepared by mixing 40 pounds of copolymer derived from acrylamide and acrylamidomethylpropanesulfonic acid in one thousand gallons (ppt) tap water and allowed to hydrate for 30 minutes. A suitable copolymer that was used in this example is commercially available as Allessan® AG 5028P from Allessa Chemie. The order of addition of the additives is as it appears in FIG. 1. As shown in FIG. 1, the apparent viscosity in centipoises (cP) was measured and plotted for the high temperature well treatment fluid at temperatures ranging from 300° F. (148.9° C.) to 500° F. (260° C.) using a $R_1B_5$ bob and cup combination against time in minutes. FIG. 1 shows stability of the high temperature well treatment fluid of the present invention without the use of breakers. The pH was controlled using two different pH buffers. As indicated in FIG. 1, some of the samples were added as a dry powder to the fracturing fluid, while others were prepared in an emulsion. A pH of 4.5 with acetic acid (BF-10L by BJ Services Company) was used in the samples up to 400° F. (204.4° C.). A pH of 4.76 with a true buffer of pH 4.5 (BF-18L by BJ Services Company) was used in the samples that were greater than 400° F. (204.4° C.). 2.5 to 3.0 gpt of a zirconate-based crosslinking agent (XLW-14 by BJ Services Company) was used in the samples. Two samples were made and measured at 400° F. (204.4° C.), one of the samples was prepared with 0.06 wt. % sodium thiosulfate gel stabilizer and the other sample was prepared without the stabilizer. As can be seen in FIG. 1, the sample at 400° F. (204.4° C.) with the stabilizer performed much better than the sample without the stabilizer, i.e., it maintained its viscosity for a longer period of time than the sample without the stabilizer.

Example 2

Figure 2:
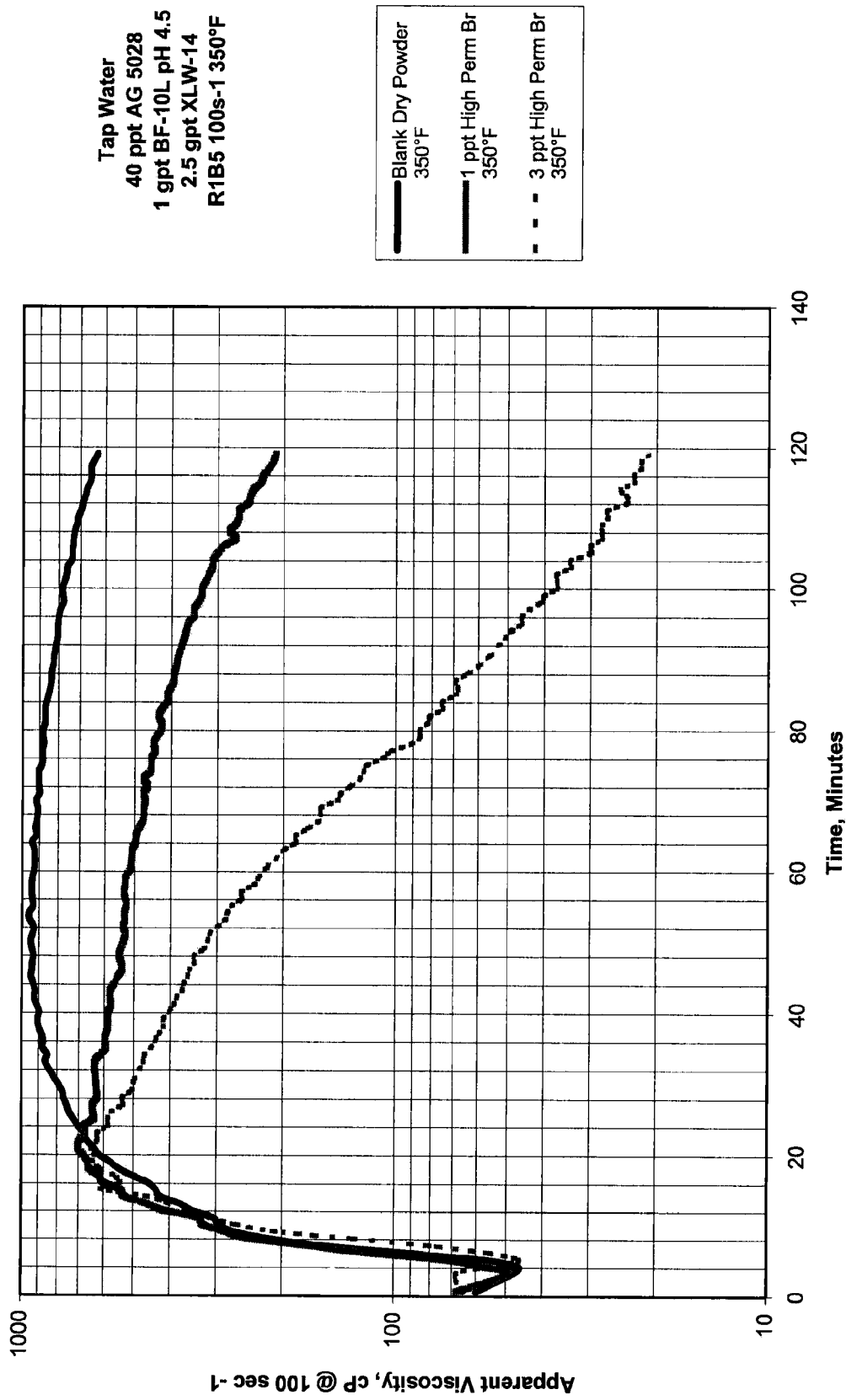
FIG. 2 is a graph of the apparent viscosity of the high temperature well treatment fluid with and without a breaker versus time at 350° F. (176.7° C.) in accordance with embodiments of the present invention.

Three samples of the high temperature well treatment fluid of the present invention were prepared by mixing 40 pounds of copolymer derived from acrylamide, acrylamidomethylpropanesulfonic acid, and vinyl phosphonate in one thousand gallons tap water (Allessan® AG 5028P from Allessa Chemie) and allowed to hydrate for 30 minutes. The order of addition of the additives is as it appears in FIG. 2. As shown in FIG. 2, the apparent viscosity was measured and plotted for the high temperature well treatment fluid at 350° F. (176.7° C.) using a $R_1B_5$ bob and cup combination against time in minutes. The pH was controlled using 1 gpt of acetic acid to pH 4.5 (e.g., BF-10L by BJ Services Company). 2.5 gallons per 1,000 gallons high temperature well treatment fluid (gpt) of a zirconate-based crosslinking agent (e.g., XLW-14 by BJ Services Company) was used in the samples. The first sample was made without the use of a breaker. The second and third samples were prepared with one and three ppt respectively of an encapsulated sodium bromate labeled as High Perm Br in FIG. 2 (High Perm BR™ Gel Breaker from BJ Services Company). As can be seen in FIG. 2, the viscosity tapers off at a consistent rate with each of the samples that contain the sodium bromate breaker, which indicates that the high temperature well treatment fluid can be degraded in a controlled manner. The viscosity of the second sample with 1 ppt breaker decreased slower than the viscosity of the third sample having 3 ppt breaker.

Example 3

Three samples of the high temperature well treatment fluid of the present invention were prepared by mixing varying amounts of copolymer derived from acrylamide, acrylamidomethylpropanesulfonic acid, and vinyl phosphonate with tap water (Allessan® AG 5028P with a built in stabilizer from Allessa Chemie) and allowed to hydrate for 30 minutes. The components, order of addition, and conditions in this example are as follows:

| Component/Condition | Sample 1 | Sample 2 | Sample 3 |
|---|---|---|---|
| Copolymer (AG 5028P), ppt | 25 | 40 | 50 |
| Gel stabilizer (GS-1L), gpt | 1 | 2 | 2 |
| Buffer (BF-65L), gpt | 1 | 1.5 | 2 |
| Crosslinking agent (XLW-65), gpt | 1.5 | 1.5 | 2 |
| Temperature, ° F. (° C.) | 350 (176.7) | 400 (204.4) | 450 (232.2) |

Figure 3:
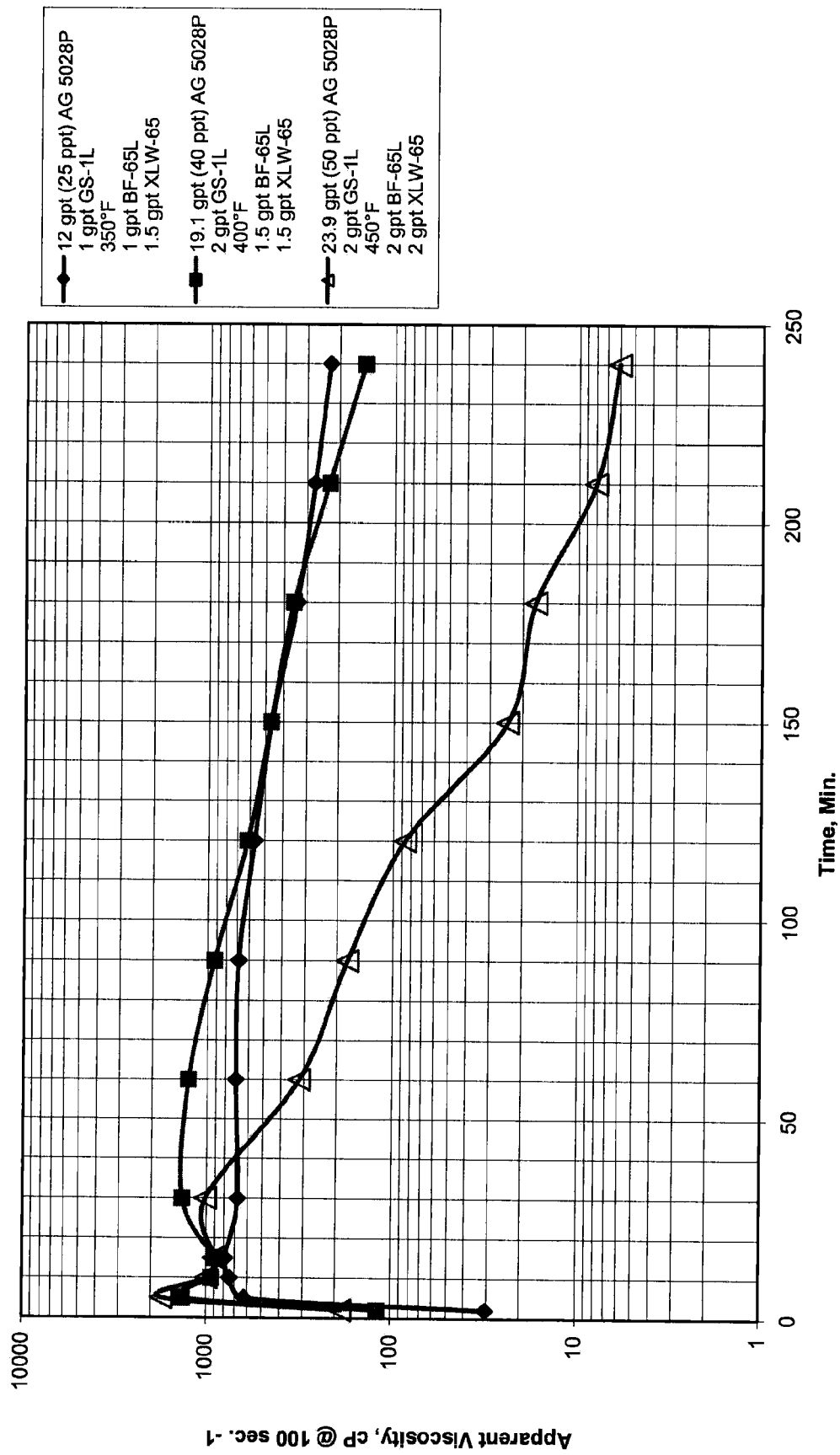
FIG. 3 is a graph of the apparent viscosity of the high temperature well treatment fluid with various amounts of copolymer and temperatures in accordance with embodiments of the present invention.

The gel stabilizer GS-1L, buffer BF-65L, and crosslinking agent XLW-65 are all commercially available from BJ Services Company. As shown in FIG. 3, the apparent viscosity was measured and plotted for the high temperature well treatment fluid at temperatures ranging from 350° F. (176.7° C.) to 450° F. (232.2° C.) using a $R_1B_5$ bob and cup combination against time in minutes. The pH was controlled using a true 5.0 pH buffer (e.g., BF-65L by BJ Services Company). As can be seen in FIG. 3, the viscosity tapers off at a consistent rate with each of the samples, which indicates that the high temperature well treatment fluid can be stable for an extended period of time and still be degraded in a controlled manner.

While the invention has been shown or described in only some of its forms, it should be apparent to those skilled in the art that it is not so limited, but is susceptible to various changes without departing from the scope of the invention. For example, various types of additives can be used in the high temperature well treatment fluid of the present invention. As another example, various types of equipment can be used for the well treatment processes described herein.

What is claimed is:

1. A method of fracturing a subterranean formation having a temperature of from about 300° F. (149° C.) to about 500° F. (260° C.), the method comprising the step of contacting a high temperature well treatment fluid comprising water; a high molecular weight copolymer derived from acrylamide, acrylamidomethylpropanesulfonic acid, and vinyl phosphonate; a crosslinking agent; a stabilizer comprising phenothiazine or a combination of sodium thiosulfate and phenothiazine, and a pH buffer that maintains a pH of the high temperature well treatment fluid in a range of about 4.5 to about 5.25 with at least a portion of the subterranean formation at pressures sufficient to fracture the subterranean formation.

2. The method of claim 1, wherein the pH buffer comprises acetic acid, sodium acetate, formic acid, or combinations thereof and is present in a range of about 1 gallon per 1,000 gallons high temperature well treatment fluid to about 3 gallons per 1,000 gallons high temperature well treatment fluid.

3. The method of claim 1, wherein the high temperature well treatment fluid can be pumped at a temperature of up to about 500° F. (260° C.) for a period of up to about 2 hours.

4. The method of claim 1, wherein the crosslinking agent is zirconium oxychloride, zirconium acetate, zirconium lactate, zirconium malate, zirconium glycolate, zirconium lactate triethanolamine, zirconium citrate, titanium lactate, titanium malate, titanium citrate, titanium, aluminum, iron, antimony, a zirconate-based compound, zirconium triethanolamine, an organozirconate, or combinations thereof.

5. The method of claim 1, wherein the high temperature well treatment fluid comprises a breaker that allows the high temperature well treatment fluid to be broken down in a controlled manner, the breaker comprising sodium bromate, ammonium persulfate, sodium persulfate, sodium perborate, sodium percarbonate, calcium peroxide, magnesium peroxide, sodium periodate, an alkaline earth metal percarbonate, an alkaline earth metal perborate, an alkaline earth metal peroxide, an alkaline earth metal perphosphate, a zinc peroxide, a zinc perphosphate, a zinc perborate, a zinc percarbonate, a boron compound, a perborate, a peroxide, a perphosphate, or combinations thereof.

6. A method of fracturing a subterranean formation having a temperature of from about 300° F. (149° C.) to about 500° F. (260° C.), the method comprising: contacting water with a high molecular weight copolymer derived from acrylamide, acrylamidomethylpropanesulfonic acid, and vinyl phosphonate to form a water-soluble polymer, contacting the water-soluble polymer with a crosslinking agent, a stabilizer comprising phenothiazine or a combination of sodium thiosulfate and phenothiazine, and a pH buffer to produce a gelling fluid; and contacting at least a portion of the subterranean formation with the gelling fluid at pressures sufficient to fracture the formation, the pH buffer maintaining a pH of the gelling fluid in a range of about 4.5 to about of about 5.25.

7. The method of claim 6, wherein the high molecular weight copolymer is present in a range of about 10 gallons per 1,000 gallons gelling fluid to about 25 gallons per 1,000 gallons gelling fluid.

8. The method of claim 6, further comprising a crosslinking agent selected from the group consisting of zirconium oxychloride, zirconium acetate, zirconium lactate, zirconium malate, zirconium glycolate, zirconium lactate triethanolamine, zirconium citrate, titanium lactate, titanium malate, titanium citrate, titanium, aluminum, iron, antimony, a zirconate-based compound, zirconium triethanolamine, an organozirconate, and combinations thereof.

9. The method of claim 6, wherein the high gelling fluid comprises a breaker that allows the gelling fluid to be broken down in a controlled manner, the breaker comprising sodium bromate, ammonium persulate, sodium persulfate, sodium perborate, sodium percarbonate, calcium peroxide, magnesium peroxide, sodium periodate, an alkaline earth metal percarbonate, an alkaline earth metal perborate, an alkaline earth metal peroxide, an alkaline earth metal perphosphate, a zinc peroxide, a zinc perphosphate, a zinc perborate, a zinc percarbonate, a boron compound, a perborate, a peroxide, a perphosphate, or combinations thereof and wherein the gelling fluid further comprises a surfactant selected from the group consisting of alkoxypoly(ethyleneoxy)ethanol, an ethoxylated alcohol having from 10 to 18 carbon molecules, and combinations thereof.

10. The method of claim 6, wherein the gelling fluid can be pumped at a temperature of up to about 500° F. (260° C.) for a period of up to about 2 hours.

11. The method of claim 1, wherein the high molecular weight copolymer has a K-value of greater than about 375.

12. The method of claim 1, wherein the high molecular weight copolymer is present in a range of about 10 gallons per 1,000 gallons high temperature well treatment fluid to about 25 gallons per 1,000 gallons high temperature well treatment fluid.

13. The method of claim 1, wherein the high molecular weight copolymer further comprises a monomer selected from the group consisting of an alkali metal of acrylamidomethylpropanesulfonic acid, an ammonium salt of acrylamidomethylpropanesulfonic acid, styrene sulfonate, vinyl sulfonate, N-vinylpyrolidone, N-vinylformamide, N-vinylacetamide, N,N-diallylacetamide, methacrylamide, acrylamide, N,N-dimethylacrylamide, methacrylamide, a divalent cation from calcium salt, a divalent cation from magnesium salt, and combinations thereof.

14. The method of claim 1, wherein the high temperature well treatment fluid further comprises a surfactant selected from the group consisting of alkoxypoly(ethyleneoxy)ethanol, an ethoxylated alcohol having from 10 to 18 carbon molecules, and combinations thereof.

15. The method of claim 5, wherein the breaker is sodium bromate, ammonium persulate, sodium persulfate, sodium perborate, sodium percarbonate, calcium peroxide, magnesium peroxide, sodium periodate, or combinations thereof.

16. The method of claim 6, wherein the high molecular weight copolymer has a K-value of greater than about 375.

17. The method of claim 6, wherein the pH buffer comprises acetic acid, sodium acetate, formic acid, or combinations thereof and is present in a range of about 1 gallon per 1,000 gallons gelling fluid to about 3 gallons per 1,000 gallons gelling fluid.

18. The method of claim 6, wherein the high molecular weight copolymer further comprises a monomer selected from the group consisting of an alkali metal of acrylamidomethylpropanesulfonic acid, an ammonium salt of acrylamidomethylpropanesulfonic acid, styrene sulfonate, vinyl sulfonate, N-vinylpyrolidone, N-vinylformamide, N-vinylacetamide, N,N-diallylacetamide, methacrylamide, acrylamide, N,N-dimethylacrylamide, methacrylamide, a divalent cation from calcium salt, a divalent cation from magnesium salt, and combinations thereof.

19. The method of claim 6, wherein the gelling fluid further comprises a surfactant selected from the group consisting of alkoxypoly(ethyleneoxy)ethanol, an ethoxylated alcohol having from 10 to 18 carbon molecules, and combinations thereof.

20. The method of claim 9, wherein the breaker is sodium bromate, ammonium persulate, sodium persulfate, sodium perborate, sodium percarbonate, calcium peroxide, magnesium peroxide, sodium periodate, or combinations thereof.

* * * * *

UNITED STATES PATENT AND TRADEMARK OFFICE
CERTIFICATE OF CORRECTION

| | |
|---|---|
| PATENT NO. | : 8,022,015 B2 |
| APPLICATION NO. | : 12/020671 |
| DATED | : September 20, 2011 |
| INVENTOR(S) | : Paul S. Carman and Jeffrey C. Dawson |

Page 1 of 1

It is certified that error appears in the above-identified patent and that said Letters Patent is hereby corrected as shown below:

Column 10, Claim 9, line 48 should read -The method of claim 6, wherein the gelling fluid-.

Signed and Sealed this
First Day of November, 2011

David J. Kappos
*Director of the United States Patent and Trademark Office*